(12) United States Patent
Amanat et al.

(10) Patent No.: US 7,130,824 B1
(45) Date of Patent: Oct. 31, 2006

(54) APPARATUS AND METHOD FOR LOAD BALANCING AMONG DATA COMMUNICATIONS PORTS IN AUTOMATED SECURITIES TRADING SYSTEMS

(75) Inventors: Irfan Amanat, New York, NY (US); Michael Bundy, Katy, TX (US)

(73) Assignee: ETP Holdings, Inc., New York, NY (US)

( * ) Notice: Subject to any disclaimer, the term of this patent is extended or adjusted under 35 U.S.C. 154(b) by 1100 days.

(21) Appl. No.: 09/643,073

(22) Filed: Aug. 21, 2000

(51) Int. Cl.
*G06Q 40/00* (2006.01)

(52) U.S. Cl. .................. 705/37; 705/35; 709/241; 709/223

(58) Field of Classification Search ............. 705/1, 705/36, 37; 370/238, 228; 709/241, 223
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 3,976,840 A | 8/1976 | Cleveland et al. | |
| 4,243,844 A | 1/1981 | Waldman | |
| 4,412,287 A | 10/1983 | Braddock, III | |
| RE31,643 E | 8/1984 | Waldman | |
| 4,585,130 A | 4/1986 | Brennan | |
| 4,588,192 A | 5/1986 | Laborde | |
| 4,674,044 A | 6/1987 | Kalmus et al. | |
| 4,677,552 A | 6/1987 | Sibley, Jr. | |
| 4,750,135 A | 6/1988 | Boilen | |
| 4,751,640 A | 6/1988 | Lucas et al. | |
| 4,903,201 A | 2/1990 | Wagner | |
| 4,949,248 A | 8/1990 | Caro | |
| 5,025,372 A | 6/1991 | Burton et al. | |
| 5,038,284 A | 8/1991 | Kramer | |
| 5,101,353 A | 3/1992 | Lupien et al. | |
| 5,136,501 A | 8/1992 | Silverman et al. | |
| 5,168,446 A | 12/1992 | Wiseman | |
| 5,253,248 A * | 10/1993 | Dravida et al. ............. 370/228 |
| 5,267,148 A | 11/1993 | Kosaka et al. | |
| 5,270,922 A | 12/1993 | Higgins | |
| 5,297,031 A | 3/1994 | Gutterman et al. | |
| 5,297,032 A | 3/1994 | Trojan et al. | |
| 5,339,392 A | 8/1994 | Risberg et al. | |
| 5,361,199 A | 11/1994 | Shoquist et al. | |
| 5,375,055 A | 12/1994 | Togher et al. | |
| 5,500,889 A | 3/1996 | Baker et al. | |
| 5,508,913 A | 4/1996 | Yamamoto et al. | |
| 5,517,406 A | 5/1996 | Harris et al. | |
| 5,557,517 A | 9/1996 | Daughterty, III | |
| 5,563,783 A | 10/1996 | Stolfo et al. | |

(Continued)

OTHER PUBLICATIONS

Lubanko, Matthew; Click & Invest Transaction Time Lag Can Surprise Cyber Investors; Hartford Courant, Jan. 23, 1999.*

*Primary Examiner*—Jagdish N Patel
(74) *Attorney, Agent, or Firm*—Conley Rose, P.C.

(57) ABSTRACT

Methods and systems for balancing data communications loads among data communications ports in systems for automated trading of securities. Embodiments typically include receiving acknowledgments of orders previously sent through a port from a broker-dealer system to a market, sending acknowledgments to the broker-dealer system, and determining that port are not overloaded. Various embodiments make determinations of overload on the basis of latency, net order count, or order count compared with acknowledgment count. Alternative embodiments send orders only through least-loaded ports. Least-loaded ports are identified on the basis of latency, net order count, or a combination of the two.

22 Claims, 13 Drawing Sheets

U.S. PATENT DOCUMENTS

| | | |
|---|---|---|
| 5,640,569 A | 6/1997 | Miller et al. |
| 5,655,088 A | 8/1997 | Midorikawa et al. |
| 5,689,652 A | 11/1997 | Lupien et al. |
| 5,727,165 A | 3/1998 | Ordish et al. |
| 5,752,237 A | 5/1998 | Cherny |
| 5,774,880 A | 6/1998 | Ginsberg |
| 5,788,234 A | 8/1998 | Siofer |
| 5,799,287 A | 8/1998 | Dembo |
| 5,806,048 A | 9/1998 | Kiron et al. |
| 5,809,483 A | 9/1998 | Broka et al. |
| 5,819,237 A | 10/1998 | Garman |
| 5,819,238 A | 10/1998 | Fernholz |
| 5,845,266 A | 12/1998 | Lupien et al. |
| 5,852,808 A | 12/1998 | Cherny |
| 5,857,176 A | 1/1999 | Ginsberg |
| 5,875,108 A | 2/1999 | Hoffberg et al. |
| 5,901,246 A | 5/1999 | Hoffberg et al. |
| 5,905,974 A | 5/1999 | Fraser et al. |
| 5,924,083 A | 7/1999 | Silverman et al. |
| 5,940,810 A | 8/1999 | Traub et al. |
| 5,946,667 A | 8/1999 | Tull, Jr. et al. |
| 5,950,176 A | 9/1999 | Keiser et al. |
| 6,473,424 B1 * | 10/2002 | DeJager et al. ............. 370/389 |
| 6,577,600 B1 * | 6/2003 | Bare ......................... 370/238 |
| 2002/0023048 A1 * | 2/2002 | Buhannic et al. ............. 705/37 |
| 2002/0026321 A1 * | 2/2002 | Faris et al. ..................... 705/1 |
| 2003/0055652 A1 * | 3/2003 | Nichols et al. ............. 704/275 |

* cited by examiner ating securities trading systems. Broker-dealer systems receive orders from customers, send the orders to markets, receive responses from markets, and communicate order status to customers. Orders are sent to markets through data communications ports. Responses are received from markets through data communications ports. Ports are dedicated to particular markets. Data communications ports have limitations upon the number of orders that can be sent through them in a particular period of time or the number of orders without acknowledgments that can be sent through them. If more orders arrive than can be sent through a port in a particular period of time, the broker-dealer system is slowed. If a port partially fails or is slowed for mechanical or electrical reasons, the broker-dealer system is slowed. If a port fails completely, the broker-dealer system is disabled with regard to the market served by that port.

APPARATUS AND METHOD FOR LOAD BALANCING AMONG DATA COMMUNICATIONS PORTS IN AUTOMATED SECURITIES TRADING SYSTEMS

BACKGROUND

Broker-dealer systems for automated trading of securities need to be fast. Broker-dealer systems receive orders from customers, send the orders to markets, receive responses from markets, and communicate order status to customers. Orders are sent to markets through data communications ports. Responses are received from markets through data communications ports. Ports are dedicated to particular markets. Data communications ports have limitations upon the number of orders that can be sent through them in a particular period of time or the number of orders without acknowledgments that can be sent through them. If more orders arrive than can be sent through a port in a particular period of time, the broker-dealer system is slowed. If a port partially fails or is slowed for mechanical or electrical reasons, the broker-dealer system is slowed. If a port fails completely, the broker-dealer system is disabled with regard to the market served by that port.

Broker-dealers often add additional ports to their systems, so that more than one port is dedicated to a particular market. Adding ports improves overall throughput of orders to markets and reduces the risk of being completely disabled with respect to a market if a port fails. System performance can still vary widely, however, from the point of view of a customer whose order is sent through a port that is slowed or stopped by overload or mechanical failure. Such a customer experiences the harmful effect of a lack of balance in the communications load among the ports for the market to which the customer's order was intended. Methods and systems are needed for balancing the communications loads among ports for markets in support of the overall quality of data communications in broker-dealer systems.

SUMMARY

A first aspect of the invention provides methods of balancing data communications loads among data communications ports in systems for automated trading of securities. The systems for trading securities include at least one broker-dealer system coupled through at least one data communications system to more than one market system. Data communications systems include ports organized so that one market is coupled to the broker-dealer system through more than one port. Embodiments of the invention include methods of load balancing applied when a new order from the broker-dealer system is available and ready to be sent through a port to a market. The inventive methods in typical embodiments are applied continually in turn to each port assigned to a market.

Embodiments of load balancing methods typically include the steps of receiving acknowledgments of orders previously sent through a port from a broker-dealer system to a market, sending acknowledgments to the broker-dealer system, and determining that port are not overloaded. Various embodiments of the present invention make determinations of overload on the basis of latency, net order count, or order count compared with acknowledgment count.

Alternative embodiments of the invention send orders only through least-loaded ports. Least-loaded ports are identified on the basis of latency, net order count, or a combination of the two.

A second aspect of the invention provides a load balancing system for automated trading of securities in which data communications loads are balanced among data communications ports. Embodiments of a load balancing system are typically coupled to a multiplicity of ports organized so that one market is coupled to a broker-dealer system through more than one port. Embodiments of a load balancing system typically function when a new order from a broker-dealer system is available and ready to be sent through a port to a market. Embodiments of a load balancing system are typically operative continually in turn upon each of the ports assigned to a market.

Embodiments of the load balancing system typically comprise at least one computer processor coupled for data communications to at least one broker-dealer system and coupled through data communications ports to more than one market. In typical embodiments, the processor is programmed to receive through a port from a market to which the port is coupled a new acknowledgment of an order previously sent through the port from the broker-dealer system to the market. The processor in typical embodiments is programmed to send the new acknowledgment to the broker-dealer system.

The processor in typical embodiments of this second aspect of the invention is programmed also to determine that the port is not overloaded, with overload being determined according to measures of latency, net order count, or order count and acknowledgment count. The processor in most embodiments is programmed also to send a new order through the port to the market. Many embodiments of the load balancing system include computer memory coupled to the processor with the processor programmed also to store in computer memory the new acknowledgment and the new order.

In many embodiments of the invention, the processor is programmed also to send orders to markets only through least-loaded ports. Processors are typically programmed to determine that a port is least loaded dependent upon latency, net order count, or a combination of latency and net order count.

DRAWINGS

DETAILED DESCRIPTION OF EXEMPLARY EMBODIMENTS

Figure 1:
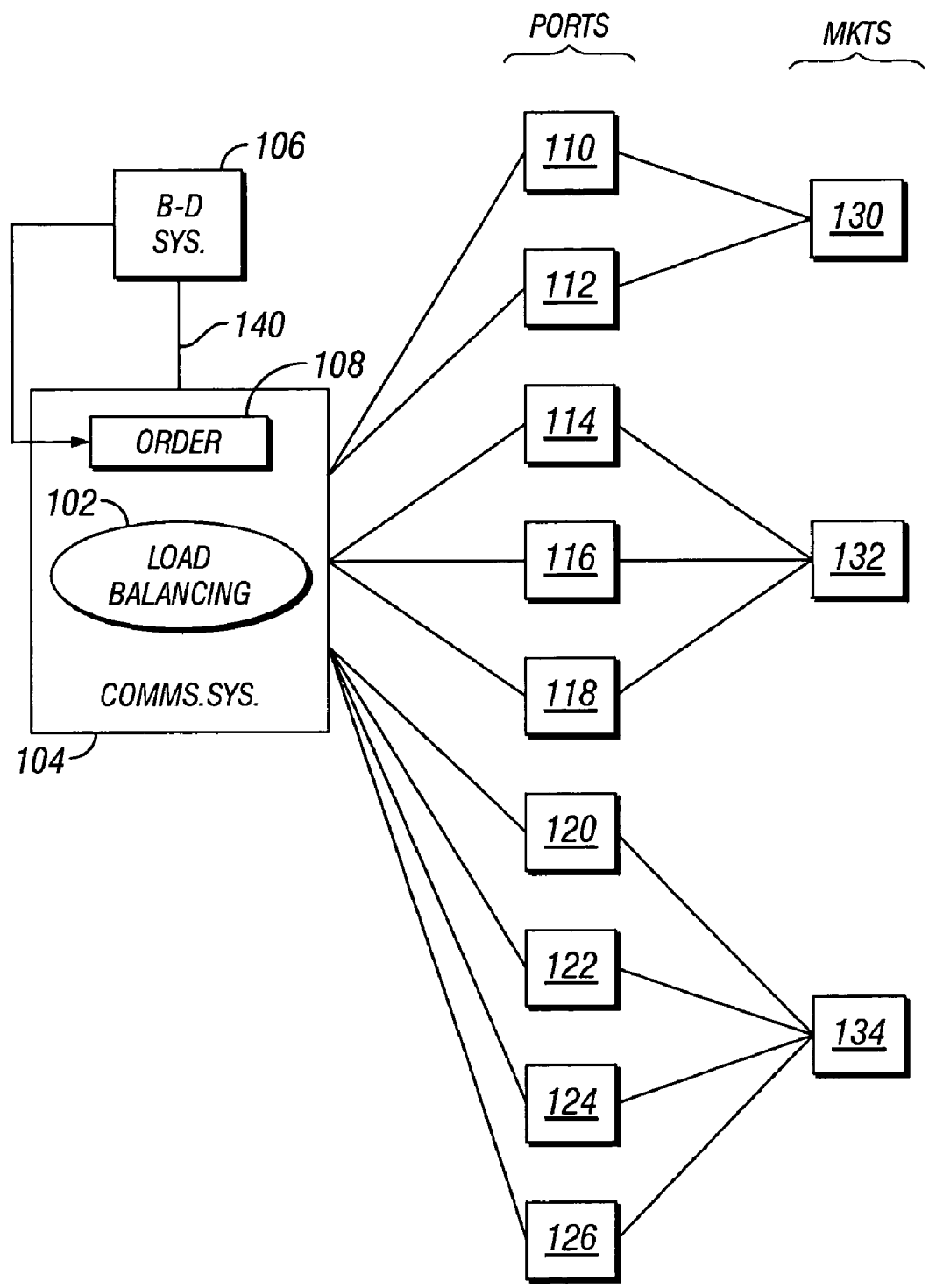
FIG. 1 is an overview of a first aspect of the invention, a method of load balancing.

Definitions:

"Acknowledgment" is a response from a market in which an order has been placed, the response being a confirmation that an order has been received by the market.

"Coupled," except when context requires otherwise, means coupled for data communications. This is particularly the case when describing broker-dealer systems as being coupled to markets through data communications ports. Broker-dealer systems typically are coupled to ports, which ports in turn typically are coupled to markets. Methods of coupling for data communications useful with the invention include all forms of data communications networks, intranets, extranets, internets, local area networks, wide area networks, dedicated lines, satellite links, and the like. Any functional method of data communications is well within the scope of the invention.

"ECN" abbreviates "Electronic Communications Network," referring to an order matching service that provides liquidity by matching orders rather than by maintaining inventory. In the context of the invention, ECNs are considered markets. ECNs, like market makers are identified by use of market participant identification codes or "MPIDs." In order to avoid confusion with data communications networks, ECNs are referred to as either "ECNs" or as "markets." Some current ECNs, their symbols and names, are listed below. The number and identities of ECNs changes from time to time.

| Example List of ECNs | |
|---|---|
| MPID | Name |
| ARCA | Archipelago |
| BTRD | Bloomberg Trade Book |
| INCA | Instinet |
| ISLD | Island |
| MWSE | Midwest Stock Exchange |
| NTRD | NexTrade |
| REDI | Speer Leeds |

"Exchange" means a national, regional, or international exchange for securities trading including for example, Nasdaq or NYSE.

"Execution," is a kinds of response to an order from a market, the execution indicating that the order has been at least partly filled, that is, that shares have been either bought or sold according to the side of the order.

"Filled" means executed. That is, all shares in the order have been executed, bought or sold according to the side of the order. If an order is subject to partial fulfillment, then the order can be partly filled and partly rejected or cancelled, in which case the order will never be considered filled. Processing of an order can therefore be completed through some combination of cancellation, rejection, killing, and partial execution without the order's ever being filled. Processing of an order is said to be complete when all the shares in the order, share by share, have been executed, cancelled, rejected, or killed.

"Latency" means a measure of the speed with which markets respond to orders and cancellations. Latency in many embodiments of the invention is determined as the difference between the time when a response to an order is received and the time when the corresponding order was routed to the market. Latency can be measured from normal orders or from test orders. Some markets support test orders as such. For markets in which test orders as such are not supported, test orders can be implemented by use of unmarketable orders immediately followed by cancellations. For markets receiving orders regularly, latency can be tracked from normal orders, without the need for test orders. Latency can be embodied as a single ratio difference between two recorded times or as various kinds of averages. One type of average latency useful with the invention is a moving average latency, a latency in which the average is dependent upon a number of recorded times for orders and acknowledgments, the times being recorded during a defined period of time, such as, for example, one trading day. Another type of average latency useful with the invention is a decaying average latency, in which the average is dependent upon a set number N of recorded times for orders and acknowledgments, the set number defining the N most recently recorded times. Other kinds of average latencies can be used, all of them being well within the scope of the invention.

"Level Two Quotes" are quotes that comprise one or more market participant quotes ("MPQs"). The best known source of level two quotes is Nasdaq, but "level two quotes" refers to any form of market information that aggregates market participant quotes for a security.

"Market," "electronic market," "market participant," "electronic market participant," "marketing network," "electronic communications network," "ECN," "exchanges," and "electronic marketing network" are all used as synonyms for services accessible through electronic communications networks capable of executing orders for securities by accepting from broker-dealers buy orders and sell orders, matching or failing to match buy orders with sell orders, and communicating the results to the broker-dealers. Generally the term "market" is used to refer to these entities.

"Market maker" means a broker-dealer providing order matching and liquidity in a stock by maintaining an inventory of the stock. Market makers typically trade their inventories through exchanges. Some currently active market makers, their symbols and names, are listed below. The number and identity of market makers can change from time to time.

| Example List of Market Makers | |
|---|---|
| MPID | Name |
| BEST | Bear, Stearns & Co., Inc. |
| BTAB | Alex, Brown & Sons, Inc. |
| GSCO | Goldman, Sachs & Co. |

-continued

Example List of Market Makers

| MPID | Name |
| --- | --- |
| HMQT | Hambrecht & Quist, LLC |
| HRZG | Herzog, Heine, Geduld, Inc. |
| JANY | Janney Montgomery Scott, Inc. |
| LEHM | Lehman Brothers, Inc. |
| MADF | Bernard L. Madoff |
| MLCO | Merrill Lynch, Pierce, Fenner & Smith Inc. |
| MOKE | Morgan, Keehan & Co., Inc. |
| MONT | Nationsbanc Montgomery Securities, LLC |
| MSCO | Morgan Stanley & Co., Inc. |
| NITE | Knight Securities, L.P. |
| OLDE | Olde Discount Corporation |
| OPCO | CIBC Oppenheimer Corporation |
| PIPR | Piper Jaffray Inc. |
| PRUS | Prudential Securities, Inc. |
| PWJC | Paine Webber, Inc. |
| RAJA | Raymond James & Associates, Inc. |
| SBSH | Smith Barney, Inc. |
| SHRP | Sharpe Capital, Inc. |
| SHWD | Sherwood Securities Corporation |

"Orders" are orders for purchase or sale of securities. In the embodiments described, "orders" are electronic orders for purchase or sale of securities.

"Quotes" are aggregates of information regarding securities traded in markets. Quotes include for securities listed for sale or purchase, symbols identifying the securities, price, side, quantities, and market identifications or MPIDs. Quotes can come from exchanges or directly from markets. A "Nasdaq Level Two Quote" includes market information in the form of market participant quotes for all markets offering to buy or sell a particular security through Nasdaq.

"Securities" are any agreement for investment. Stocks are the securities most often addressed in described embodiments of the invention. The invention, however, is applicable to many kinds of securities including, for example, options, commodities, and bonds.

"Side" refers to which side of the market is represented by an order or a quote. Side indicates whether the quote or order is to buy or sell, bid or ask. "Bid" indicates the buy side. "Ask" indicates the sell side. The present invention functions equally for either side of a transaction. Therefore we attempt to speak in neutral terms regarding side. We speak of execution rather than buying or selling. We use the term "price improvement" to indicate both price reductions for buy orders and price increases for sell orders.

DETAILED DESCRIPTION

FIG. 1 shows an overview of a first aspect of the invention, a method (102) of load balancing data communications ports in systems for automated trading of securities. In the first illustrated embodiment, the systems include at least one broker-dealer system (106) coupled for data communications (140) through at least one data communications system (104) to more than one market (130–134). The illustrated embodiment of the data communications system is coupled to a multiplicity of data communications ports (110–126) organized so that one market (130) is coupled to the broker-dealer system through more than one port (110,112). The method (102) is applied when a new order (108) from the broker-dealer system (106) is available and ready to be sent through a port to a market. In typical embodiments, the method is applied continually in turn to each of the ports assigned to a market.

Figure 2:
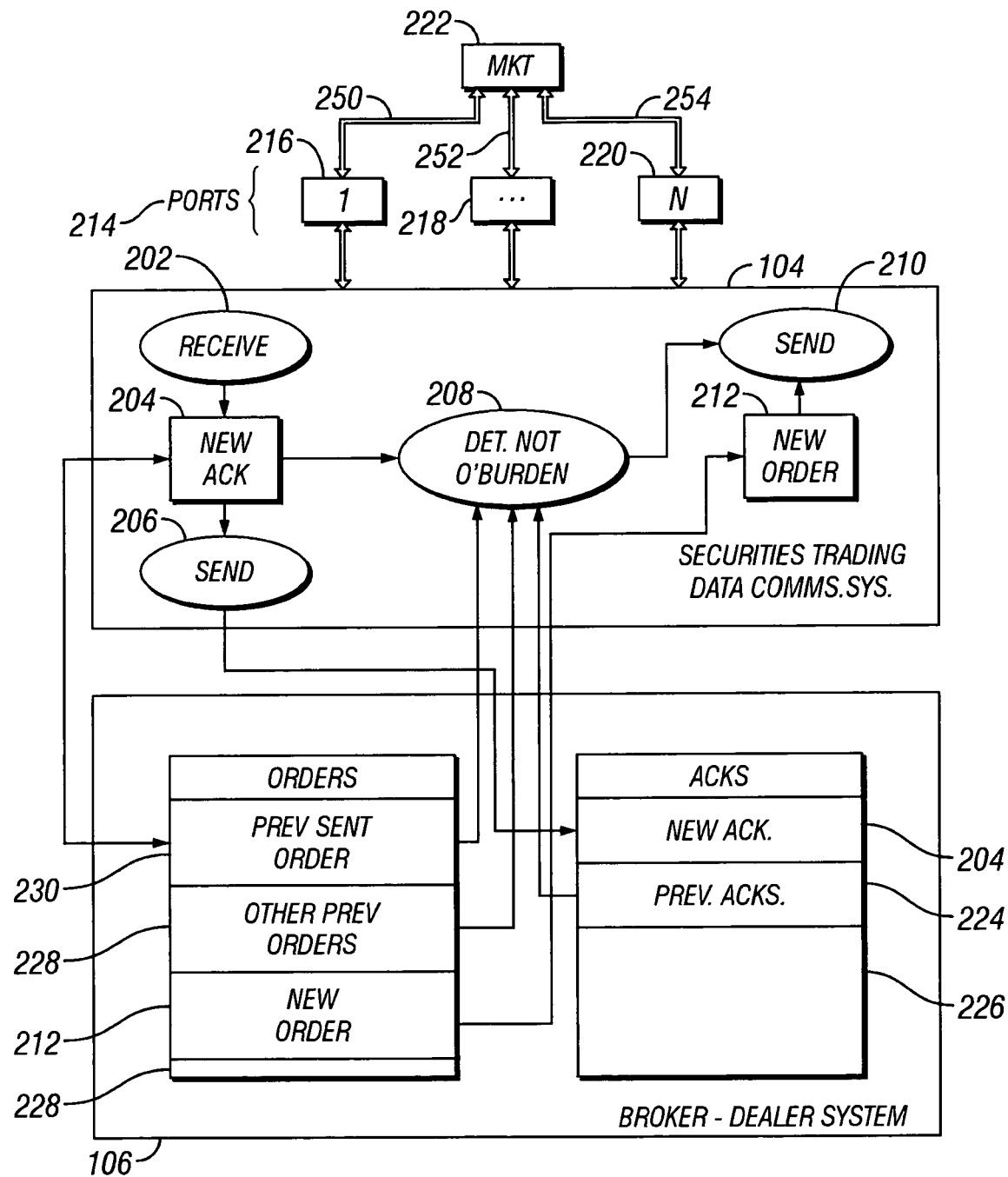
FIG. 2 is a detailed data flow view of various embodiments of the invention.

FIG. 2 is a more specific illustration of certain embodiments of the invention. One embodiment shown in FIG. 2 includes receiving (202) through a port (218) from a market (222) to which the port is coupled (252) a new acknowledgment (204) of an order (230) previously sent through the port from the broker-dealer system to the market. This embodiment includes sending (206) the new acknowledgment (204) to the broker-dealer system (106) where the new acknowledgment is stored in computer memory (226) with other acknowledgment (224). The illustrated embodiment includes determining (208) that the port is not overloaded, the determination being dependent upon the previously-sent order (230), the new acknowledgment (204), and optionally also dependent upon other previous orders (228) and upon previous acknowledgments (224). The illustrated embodiment also includes sending (210) a new order (212) through the port to the market. Sending (210) the new order is dependent upon the determination (208) that the port is not overloaded. That is, in this embodiment, new orders are sent to markets only through ports that are not overloaded.

Figure 3:
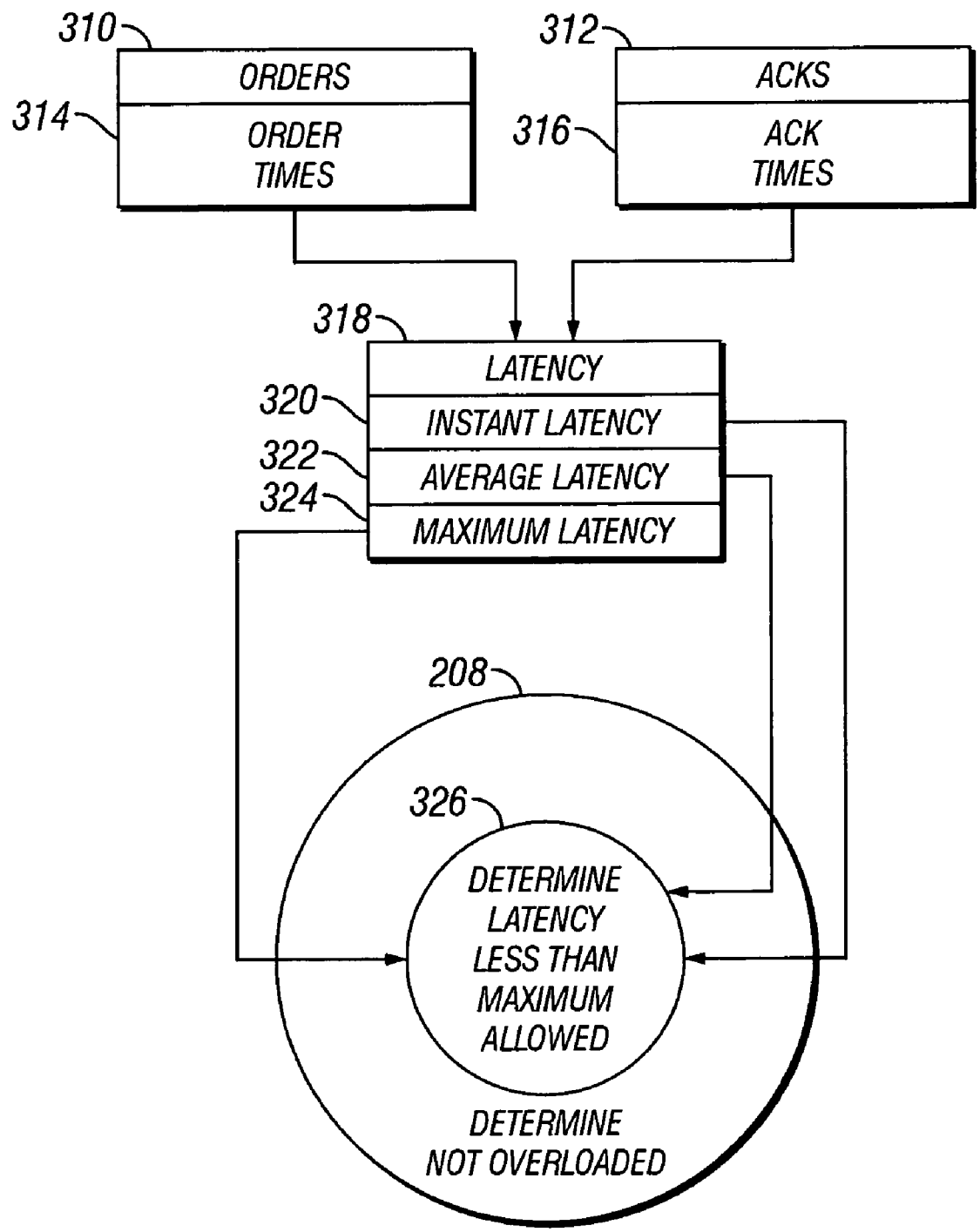
FIG. 3 illustrates a determination of no overload by determining that latency is less than the maximum allowed.

In a further embodiment shown in FIG. 3, determining (208) that the port is not overloaded further comprises determining (326) that a latency (320, 322) for the port is less than a maximum allowed latency (324) for the port. Latency comprises a measure of the speed with which markets return acknowledgments for orders.

As shown in FIG. 3, in one embodiment, the latency for the port is an instant latency (320). In an alternative embodiment, the latency for the port is an average latency (322). In embodiments using latencies as shown in FIG. 3, the port latencies are dependent upon orders (310) and acknowledgments (312) in that the latencies comprise various kinds of comparisons between order times (314), the times when particular order were sent to a market, and acknowledgment times (316), the times when acknowledgments corresponding to particular orders were received back from markets.

Figure 5:
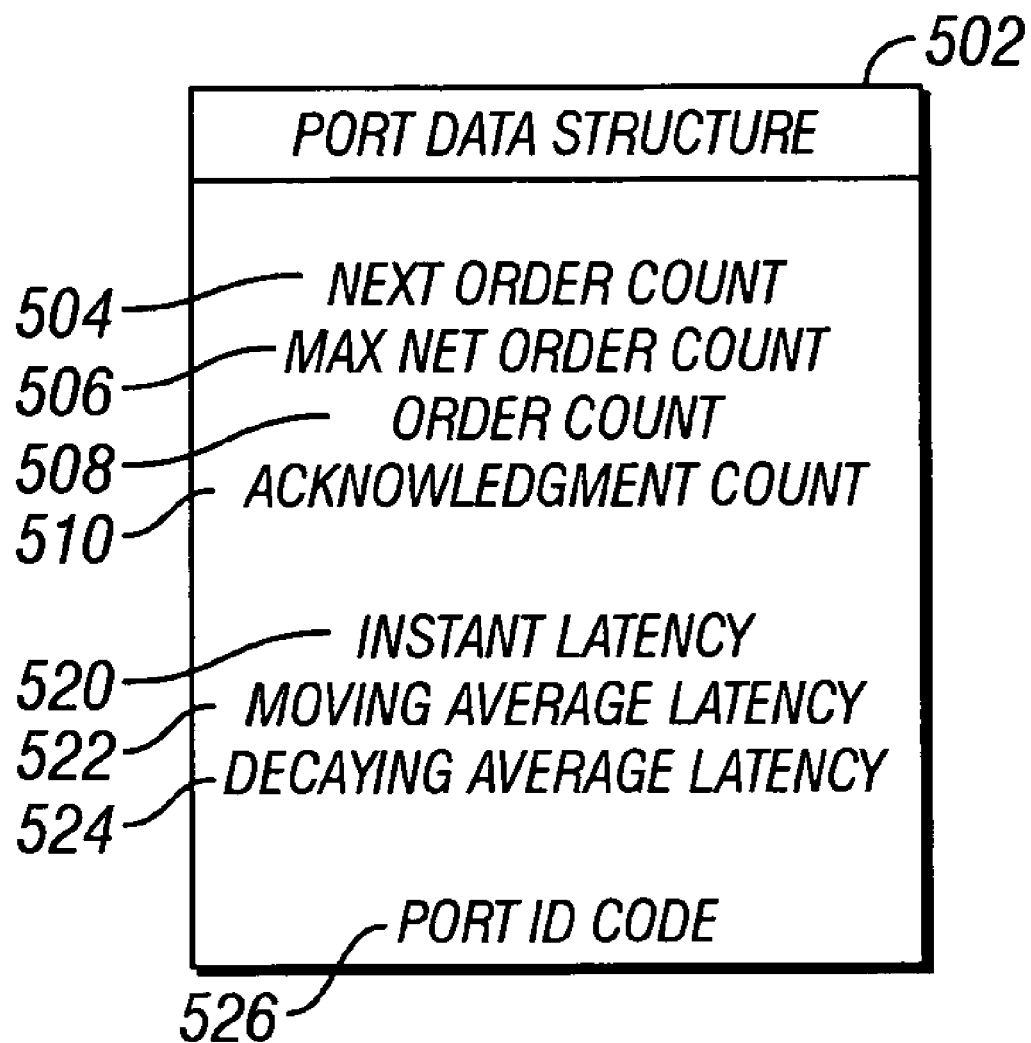
FIG. 5 is an example port data structure.

More specifically, an instant latency (320) is the difference between the time when a recent acknowledgment was received and the time when the acknowledgment's corresponding order was sent. In addition, as shown in FIG. 5, an average latency in some embodiments is a decaying average (524) and in other embodiments is a moving average (522). Examples of methods and systems useful with the present invention for calculating latencies are set forth in U.S. application Ser. No. 09/574,595, "Latency Monitor", filed May 19, 2000, which is hereby incorporated by reference for all purposes. The use of any method of calculating latency is well within the present invention.

Figure 4:
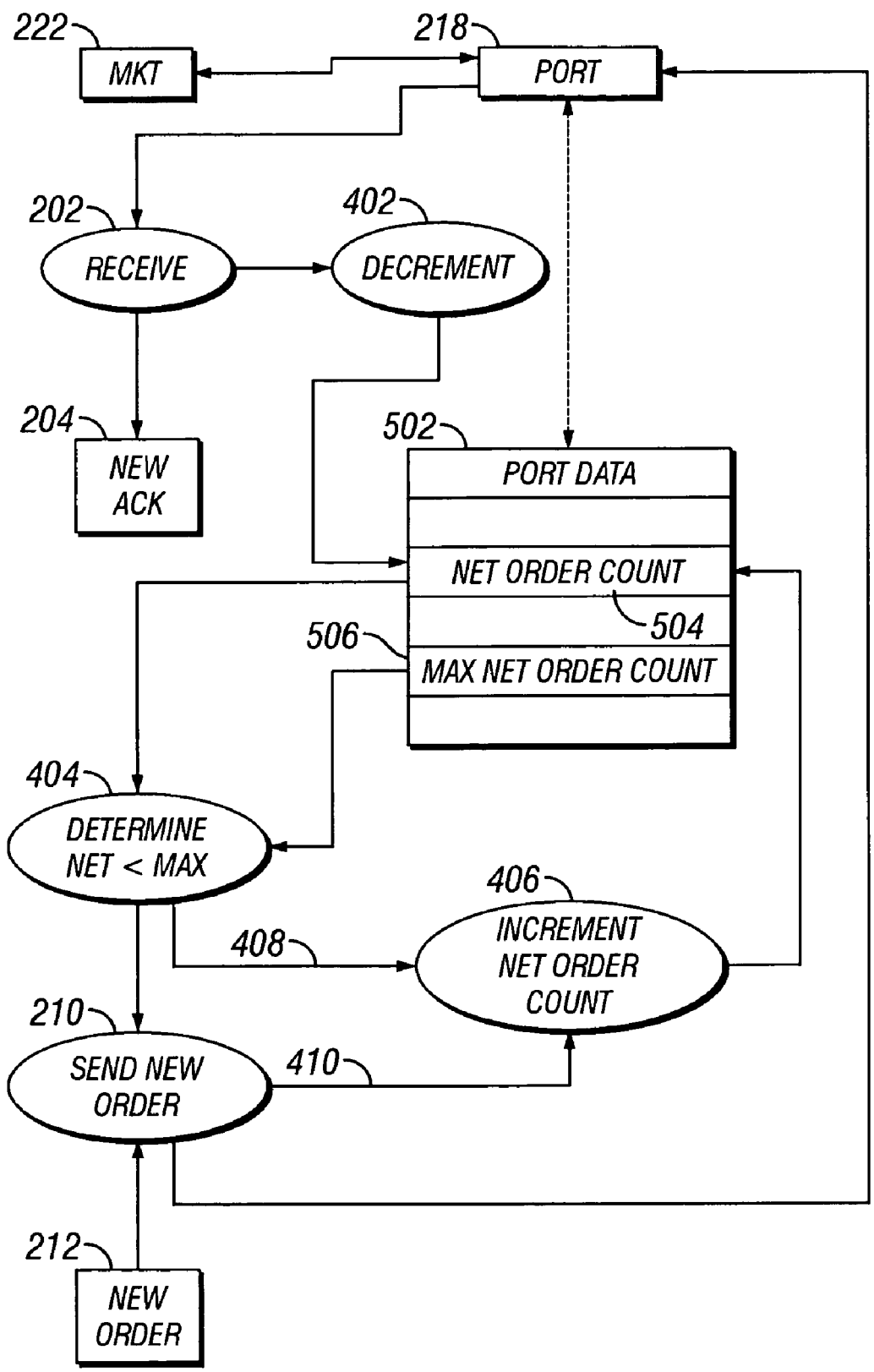
FIG. 4 illustrates a determination of no overload by determining that a net order count is less than a maximum net order count.

A further embodiment shown in FIG. 4 includes decrementing (402) a net order count (504) for the port (218), wherein the net order count (504) indicates the net number of orders sent through the port to the market for which acknowledgments have not yet been received from the market. The net order count (504) for the port (218) is stored in computer memory in a port data structure (502).

An example of a port data structure useful in many embodiments of the invention is shown in FIG. 5. The term "port data structure" means a data structure for storing data descriptive of the port. It does not mean that the port data structure is part of the port. On the contrary, in most embodiment, port data structures are stored in computer memory in a communications system in which a method of load balancing method is implemented according to the present invention.

The further embodiment illustrated in FIG. 4 includes determining (404) that the net order count (504) is less than a maximum allowed net order count (506) for the port. The maximum net order count (506) indicates the maximum number of orders without acknowledgments allowed to be sent through the port (218). The fact that the net order count (504) is less than the maximum net order count (506) for the port (218) indicates that the port (218) is not overloaded.

This further embodiment shown in FIG. 4 includes incrementing (406) the net order count. Alternative embodiments increment (406) the net order count (504) after determining (404) that the net order count (504) is less than the maximum net order count (506) for the port but before (408) sending (210) a new order (212) to market (222). Other embodiments increment (406) the net order count (504) after determining (404) that the net order count (504) is less than the maximum net order count (506) for the port (218) and also after (410) sending (210) a new order (212) to market (222).

Figure 6:
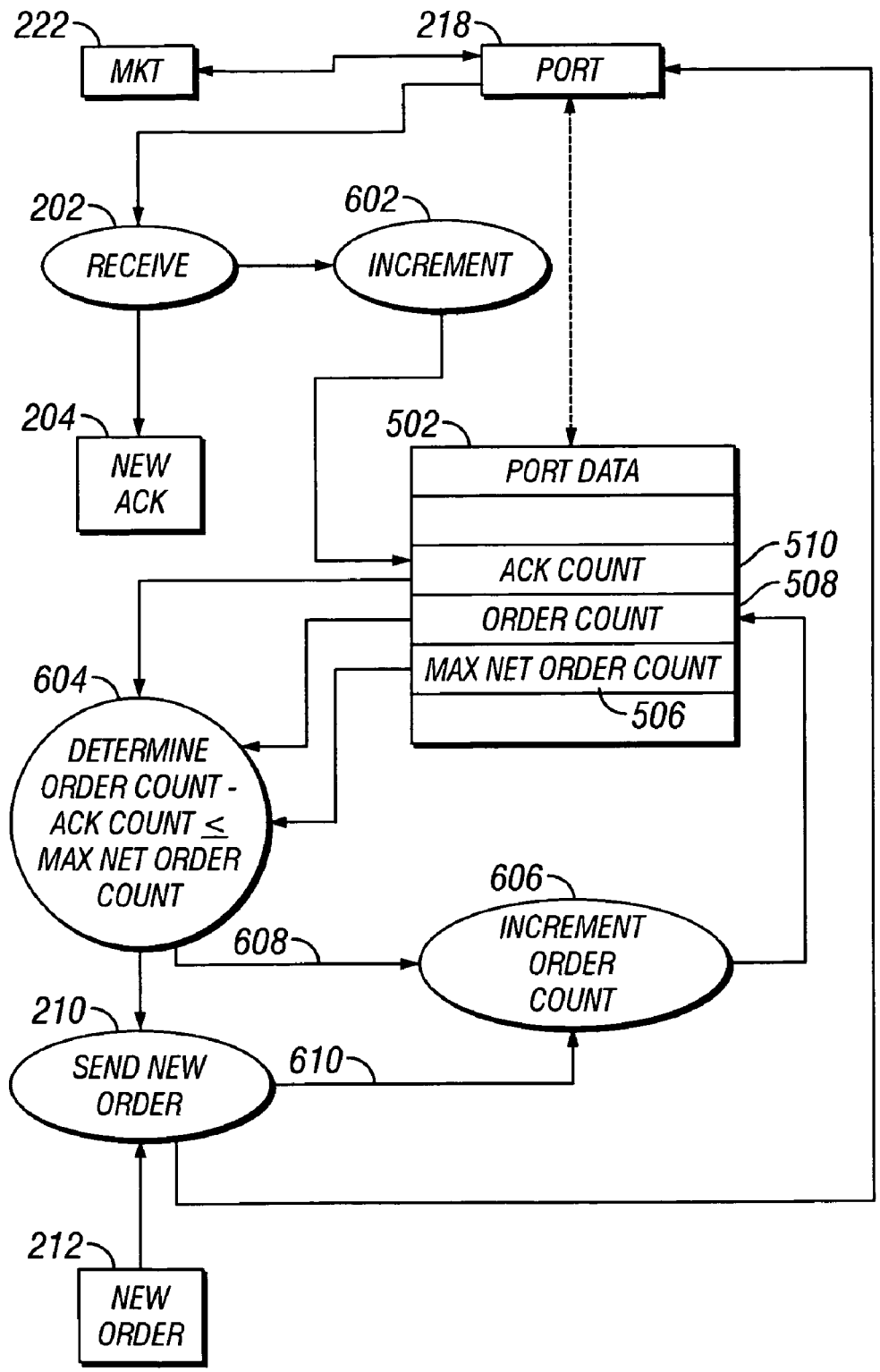
FIG. 6 illustrates a determination of no overload by determining that an order count exceeds an acknowledgment count by less than a maximum net order count.

A further embodiment shown in FIG. 6 includes incrementing (602) an acknowledgment count (510) for the port (218). The acknowledgment count (510) represents the number of acknowledgments received through the port (218) during a defined period of time. An example of a period of time useful with various embodiments of the invention is one trading day. Other embodiments use other time periods, some shorter, some longer. Any functional time period is within the scope of the invention.

A further embodiment shown in FIG. 6 includes determining (604) that an order count (508) for the port (218) exceeds the acknowledgment count (510) for the port (218) by at least a maximum net order count (506). The order count (508) represents the number of orders sent through the port (218) during the defined period of time. The maximum net order count (506) indicates the maximum number of orders for which acknowledgments have not been received allowed to be sent through the port. The fact that the order count (508) for the port (218) exceeds the acknowledgment count (510) by at least the value of the maximum net order count (506) indicates that the port (218) is not overloaded.

This illustrated embodiment of FIG. 6 includes incrementing (606) the order count for the port. Alternative embodiments increment (606) the order count (508) after determining (604) that the order count (508) for the port (218) exceeds the acknowledgment count (510) by at least the value of the maximum net order count (506) but before (608) sending (210) a new order (212) to market (222). Other embodiments increment (606) the order count (508) after determining (604) that the order count (508) for the port (218) exceeds the acknowledgment count (510) by at least the value of the maximum net order count (506) and also after (610) sending (210) a new order (212) to market (222).

Figure 7:
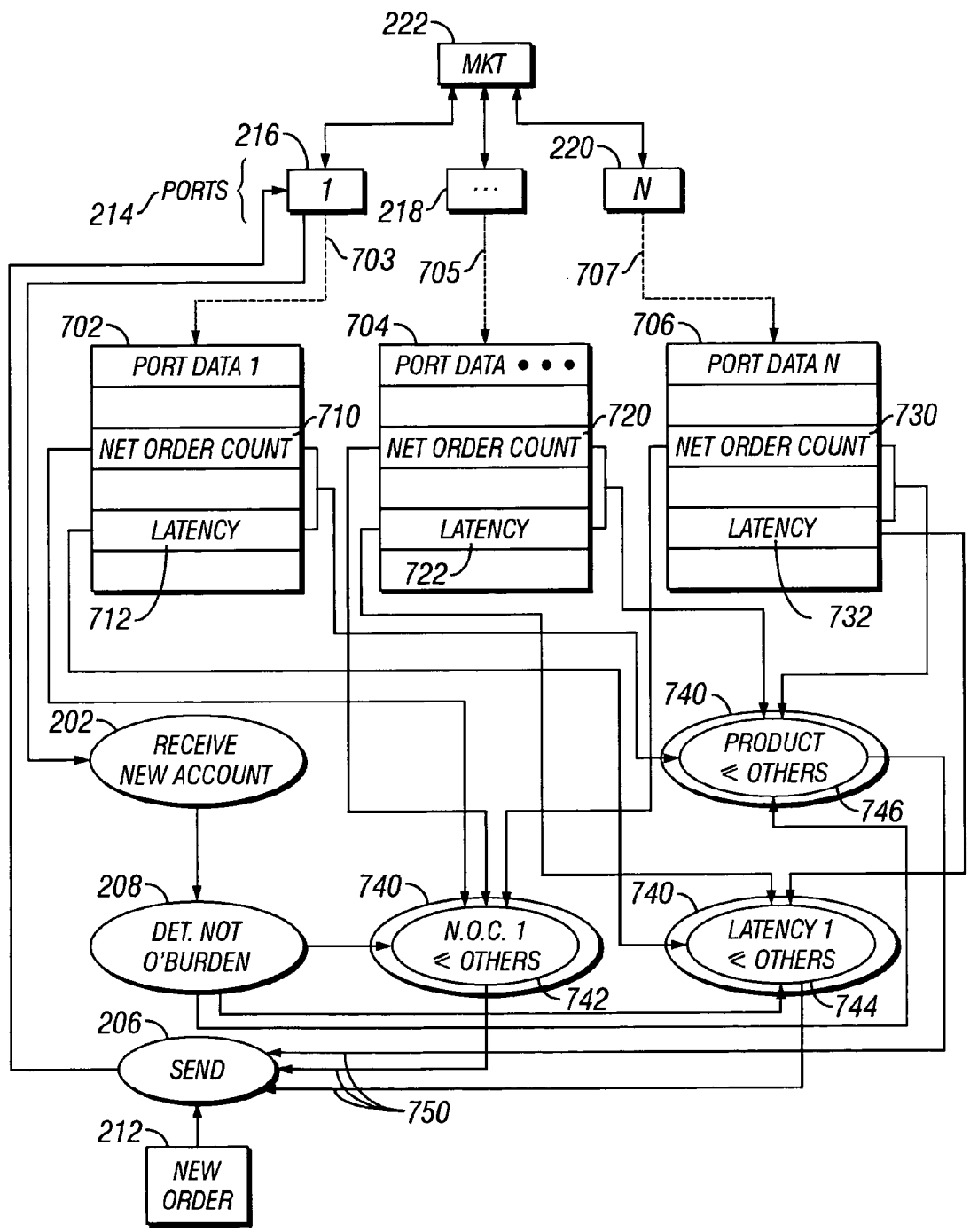
FIG. 7 illustrates alternative embodiments effecting load balancing by use of least-loaded ports.

A further embodiment of the invention as shown in FIG. 7 includes determining (740), before sending (206) the new order (212) through the port (216) to the market (222), that the port is a least-loaded port. In this kind of embodiment, sending (206) the new order (212) through the port to the market is dependent (750) upon determining that the port is a least-loaded port (740).

More specifically, in this kind of embodiment, shown in FIG. 7, utilizing detection of least-loaded ports for load balancing, new orders typically are sent only through ports determined to be least-loaded. "Least-loaded" means generally that according to some measure of data communications load, the load of the subject port is at least as low as any other port. That is, although there may be other ports for the market having the same load as the subject port, there is no port with a lower load. Measures of data communications load useful with the invention include, for example, measure of latency and net order count.

In a specific embodiment shown in FIG. 7, determining that the port is a least-loaded port (740) further comprises determining (742) that the net order count (710) for the port (216) is not greater than any of the net order counts (720, 730) for the other ports (218, 220) coupled to the market (222). In this illustrated embodiment, determining (742) that the net order count (710) for the port (216) is not greater than any of the net order counts (720, 730) for the other ports (218, 220) coupled to the market (222) is the indication that the port (216) is a least-loaded port. As shown in FIG. 7, the embodiment provides data structures (702, 704, 706) for computer memory in which are stored the net order counts (710, 720, 730), one data structure (702, 704, 706) corresponding (703, 705, 707) to each port (216, 218, 220). The net order counts (710, 720, 730) indicate the net number of orders sent through the ports (216, 218, 220) to the market (222) for which acknowledgments have not yet been received from the market.

An alternative embodiment shown also in FIG. 7 determines (740) the port (216) to be least-loaded by determining (744) that a latency (712) for the port is not greater than any of the latencies (722, 732) for the other ports (218, 220) coupled to the same market (222). In this illustrated embodiment, the latencies (712, 722, 732) are stored in port data structures (702, 704, 706), one data structure for each port. Latency comprises a measure of the speed with which markets return acknowledgments for orders.

Each port, in the illustrated embodiment of FIG. 7, is characterized by a measured or calculated latency (712, 722, 732). The latencies in various embodiments are instant latencies, moving average latencies, decaying average latencies, or other forms of latency. Most forms of measurement or calculation of the speed or time delay required to send orders to a market through a port and receive in return corresponding acknowledgments are functional latencies within the scope of the present invention.

A further alternative embodiment shown in FIG. 7 determines (740) that the port is a least-loaded port by determining (746) that the product of the net order count (710) for the port (216) multiplied by the latency (712) for the port (216) is not greater than the product of net order count (720, 730) and latency (722, 732) for any other port (218, 220) coupled to the market (222). In this illustrated embodiment, the latencies (712, 722, 732) and the net order counts (710, 720, 730) are stored in port data structures (702, 704, 706), one data structure for each port.

Figure 8:
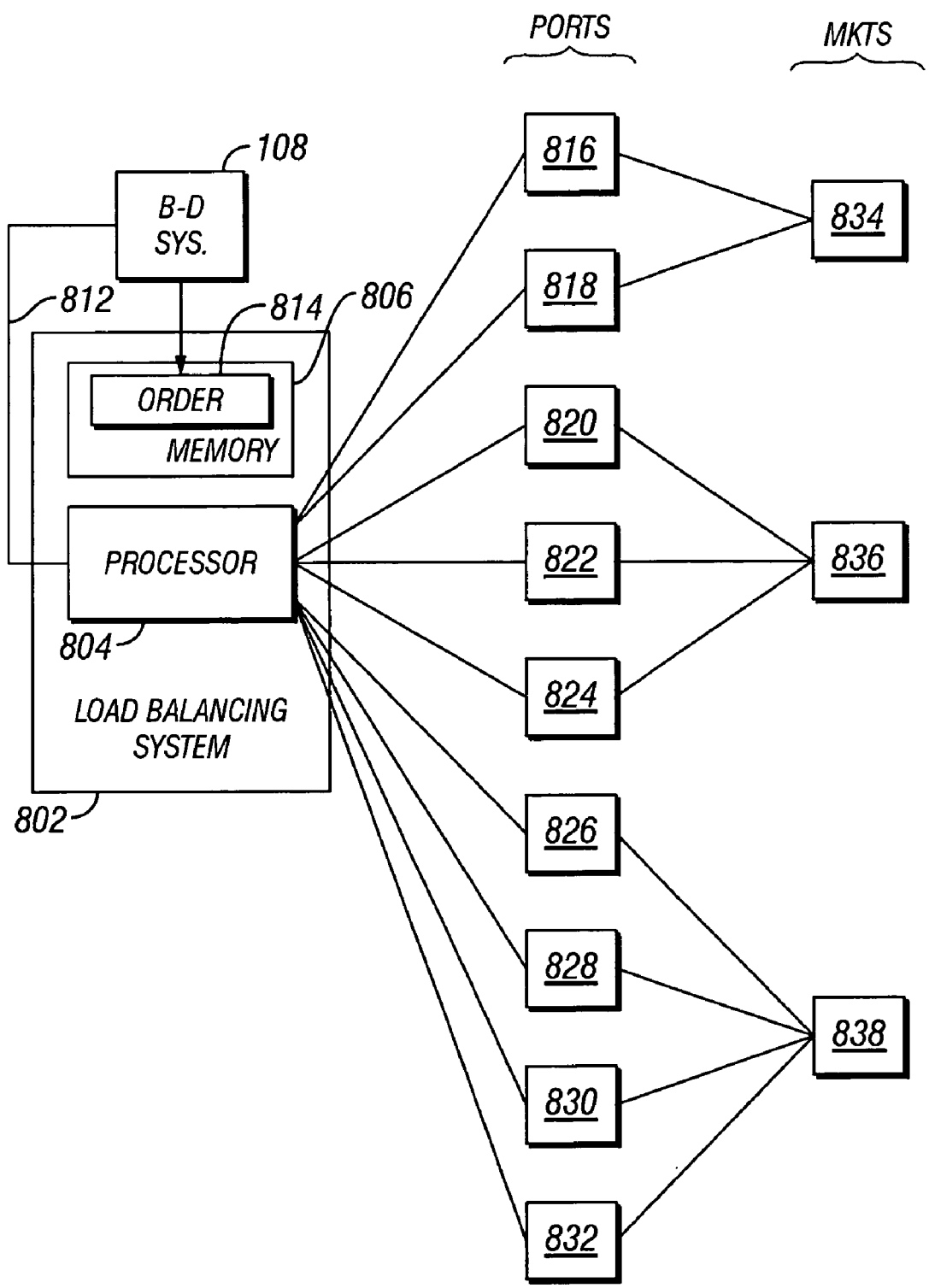
FIG. 8 is an overview of a second aspect of the invention, a load balancing system.

Turning to FIG. 8, an overview of a further aspect of the invention is seen. FIG. 8 shows a load balancing system (802) for automated trading of securities in which data communications loads are balanced among data communications ports (816–832). The load balancing system (802) in one embodiment illustrated in FIG. 8 is coupled to a multiplicity of ports (816–832) organized so that one market is coupled to the broker-dealer system through more than one port, the markets identified in FIG. 8 by reference numbers 834–838. In the embodiment illustrated, the load balancing system (832) is programmed to operate when a new order (814) from a broker-dealer system (810) is available and ready to be sent through a port (816–832) to a market (834–838). The load balancing system of the kind illustrated in FIG. 8 is programmed to operate continually in turn upon each of the ports assigned to a market.

Figure 9:
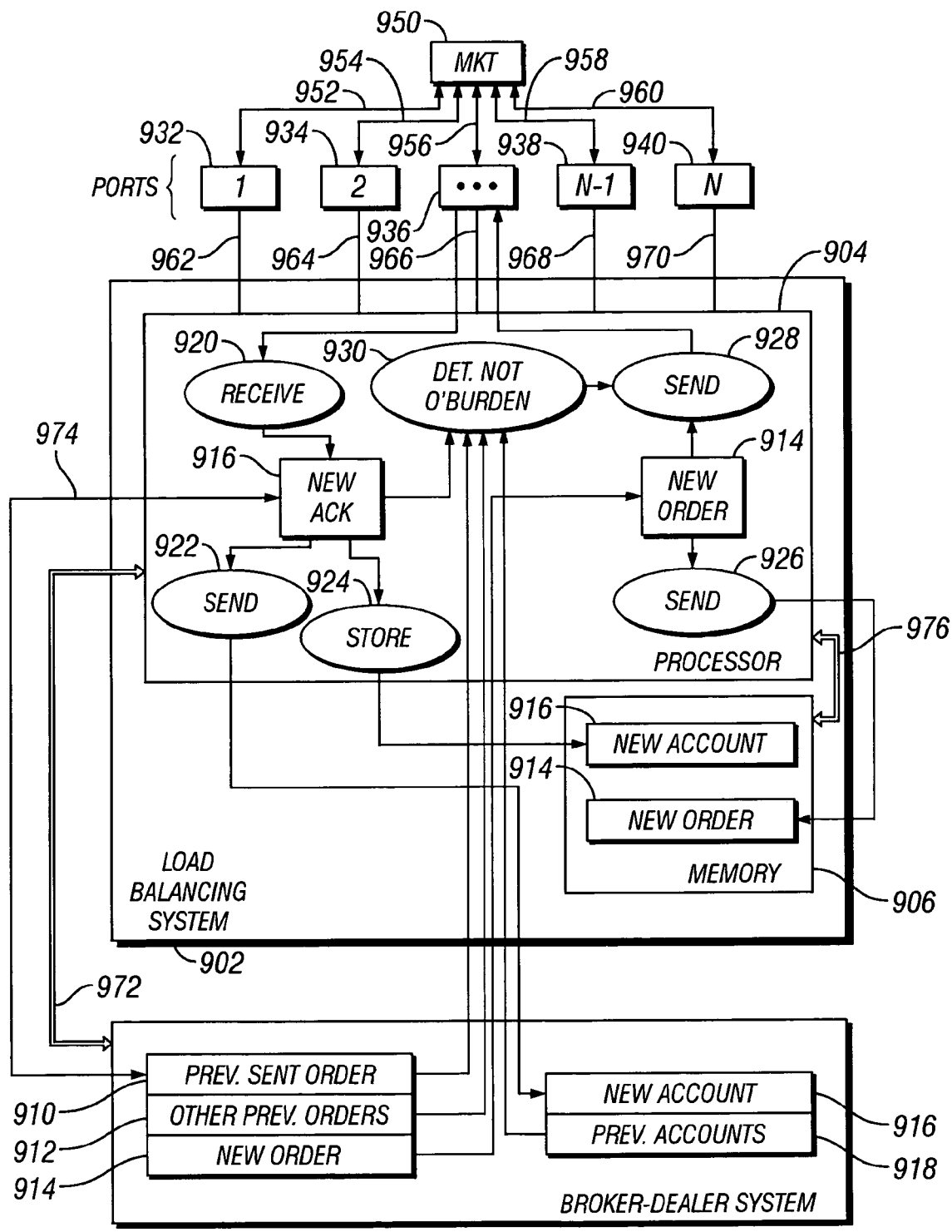
FIG. 9 is a detailed structure view of various embodiments of the invention.

Turning now to FIG. 9, more specific embodiments of a load balancing system (902) are shown. In one of the embodiments shown in FIG. 9, the load balancing system (902) includes at least one computer processor (904) coupled (972) for data communications to at least one broker-dealer system (908). In this embodiment, the processor is coupled (962–970) through data communications ports (932–940) to a market (950). In the illustration of FIG. 9, only one market and one group of associated ports are shown. In most embodiments, the processor is coupled to more than one market, and each market is coupled to at least one port, as shown on FIG. 8.

In a further embodiment shown in FIG. 9, the processor (904) is programmed to receive (920) through a port (936) from a market (950) to which the port is coupled (956) a new acknowledgment (916) of an order previously sent through the port (974, 910) from the broker-dealer system to the market. In this illustrated embodiment, the processor is programmed to send (922) the new acknowledgment (916) to the broker-dealer system (908). This embodiment includes the processor programmed to determine (930) that the port (936) is not overloaded. In the illustrated embodiment, the determination that the port is not overloaded is dependent upon the previously-sent order (910), the new acknowledgment (916), and optionally also dependent upon other previous orders (912) and upon previous acknowledgments (918).

The embodiment illustrated in FIG. 9 also includes the processor programmed to send (928) a new order (914) through the port (936) to the market (950). The processor's sending (928) the new order (914) is dependent upon the determination (930) that the port is not overloaded. More specifically, in embodiments of the kind illustrated, orders are sent to markets over through non-overloaded ports.

The embodiment illustrated in FIG. 9 includes computer memory (906) coupled (976) to the processor (904). In the illustrated embodiment, the processor (904) is further programmed to store (924) in the computer memory (906) the new acknowledgment (916) and the new order (914).

Figure 10:
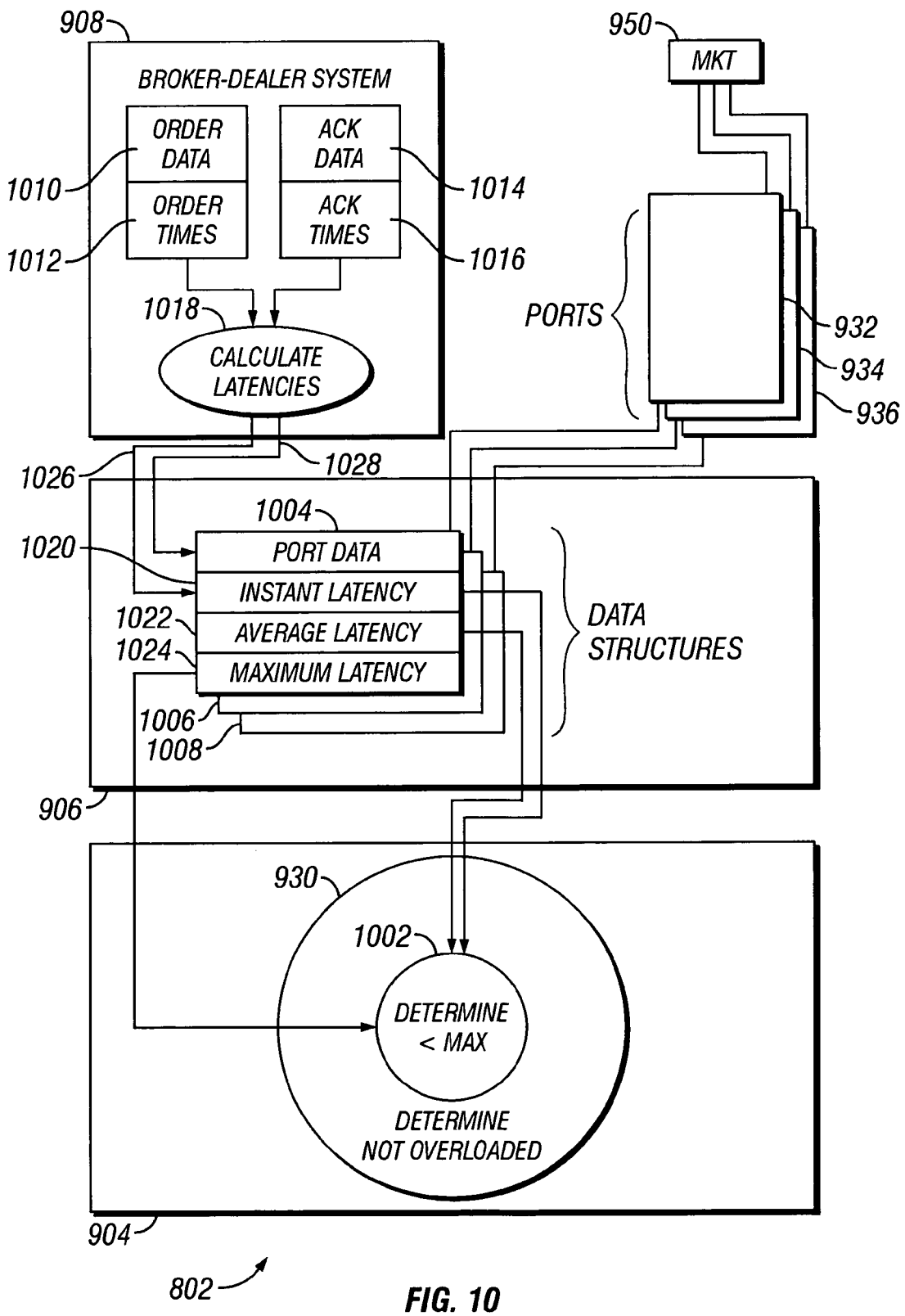
FIG. 10 illustrates a processor programmed for a determination of no overload by determining that latency is less than the maximum allowed.

In a further embodiment shown in FIG. 10, the processor (904) programmed to determine that a port is not overloaded (930) further comprises the processor programmed to determine (1002) that a latency (1020, 1022) for a port (932) is less than a maximum allowed latency (1024) for the port. Latency comprises a measure of the speed with which markets return acknowledgments for orders. In one embodiment shown in FIG. 10, the latency for the port is an instant latency (1020). In an alternative embodiment, the latency for the port is an average latency (1024).

In embodiments using latencies as shown in FIG. 10, the port latencies are dependent upon order data (1010) and acknowledgment data (1014) in that the latencies comprise various kinds of comparisons between order times (1012) and acknowledgment times (1016). Order times are the times when particular order were sent to a market, and acknowledgment times (1016) are the times when acknowledgments corresponding to particular orders were received back from markets.

More specifically, an instant latency (1020) is the difference between the time when a recent acknowledgment was received and the time when the acknowledgment's corresponding order was sent. In addition, as shown in FIG. 5, an average latency in some embodiments is a decaying average (524) and in other embodiments is a moving average (522). Examples of methods and systems useful with the present invention for calculating latencies are set forth in U.S. application Ser. No. 09/574,595, "Latency Monitor", filed May 19, 2000, which is hereby incorporated by reference for all purposes. The use of any method of programming a processor to calculate latency is well within the present invention.

In the embodiment shown in FIG. 10, the latency calculations (1018) are performed in a broker-dealer system (908) and provided (1026, 1028) to the load balancing system for storage in computer memory (906). In other embodiments, the processor in the load balancing system is programmed to calculate latencies. In the illustrated embodiment of FIG. 10, the latencies are stored in memory in port data structures (1004–1008) with one data structure provided for each port (932–936) used with the system. An example of a useful port data structure is shown in FIG. 5. Many alternative structures for port data are useful within the scope of the invention.

Figure 11:
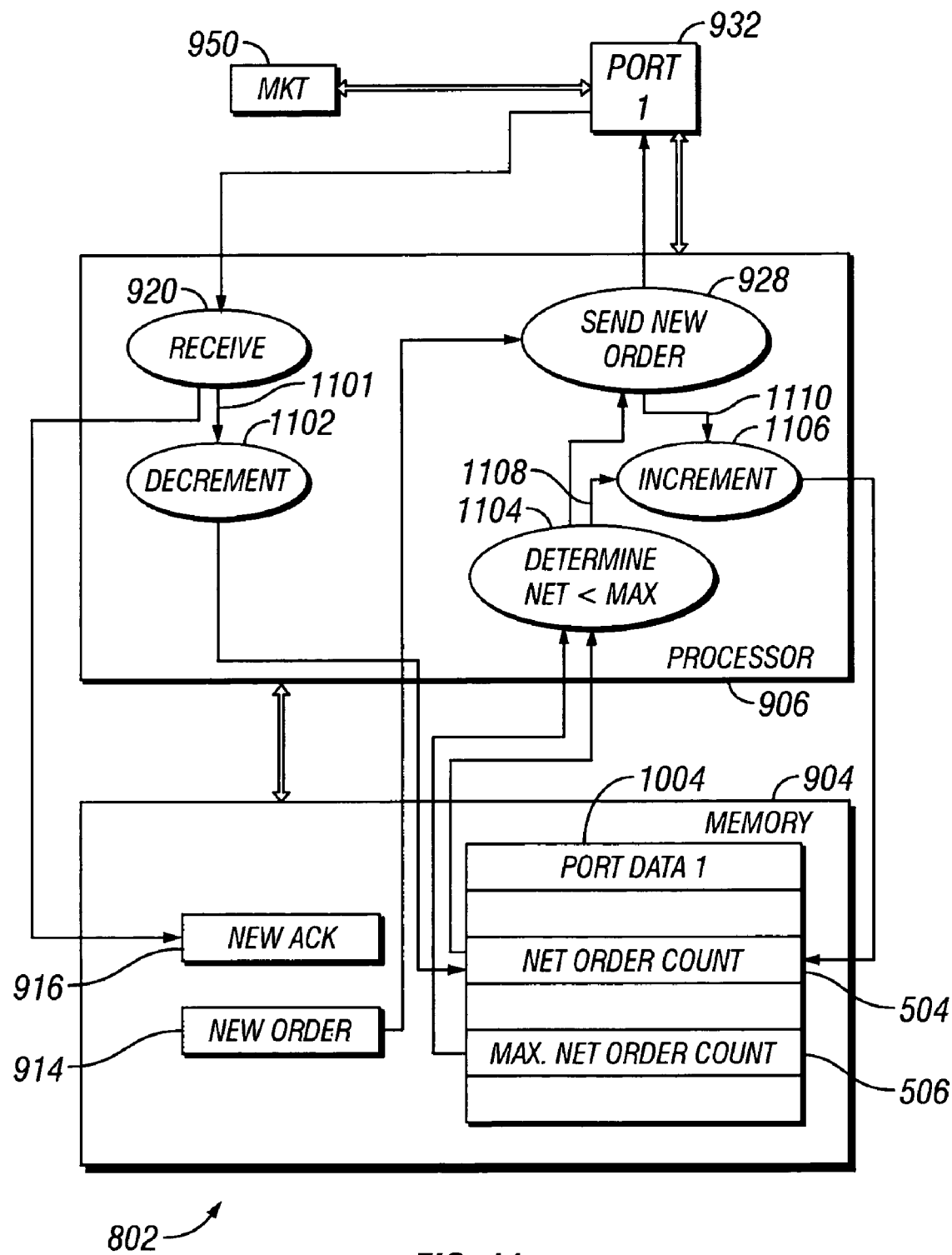
FIG. 11 illustrates a processor programmed for a determination of no overload by determining that a net order count is less than a maximum net order count.

A further embodiment of the invention as shown in FIG. 11 includes the processor (906) programmed to decrement (1102) a net order count (504) for the port (932). The net order count (504) indicates the net number of orders sent through the port (932) to the market (950) for which acknowledgments have not yet been received from the market. In this embodiment, the net order count (504) is decremented (1102) after (1101) receiving (920) a new acknowledgment (916).

The embodiment shown in FIG. 11 includes the processor (906) programmed to determine (1104) that the net order count (504) is less than a maximum allowed net order count (506) for the port (932). The maximum allowed net order count (506) indicates the maximum number of orders without acknowledgments allowed to be sent through the port (932). The fact that the net order count is less than the maximum allowed net order count for the port indicates that the port is not overloaded.

This embodiment illustrated in FIG. 11 includes the processor programmed to increment (1106) the net order count. In some embodiments, the processor is programmed to increment (1106) the net order count after determining (1104) that the net order count is less than the maximum net order count but before (1108) sending a new order to market. In other embodiments, the processor is programmed to increment (1106) the net order count after determining (1104) that the net order count is less than the maximum net order count and after (1110) sending a new order to market.

Figure 12:
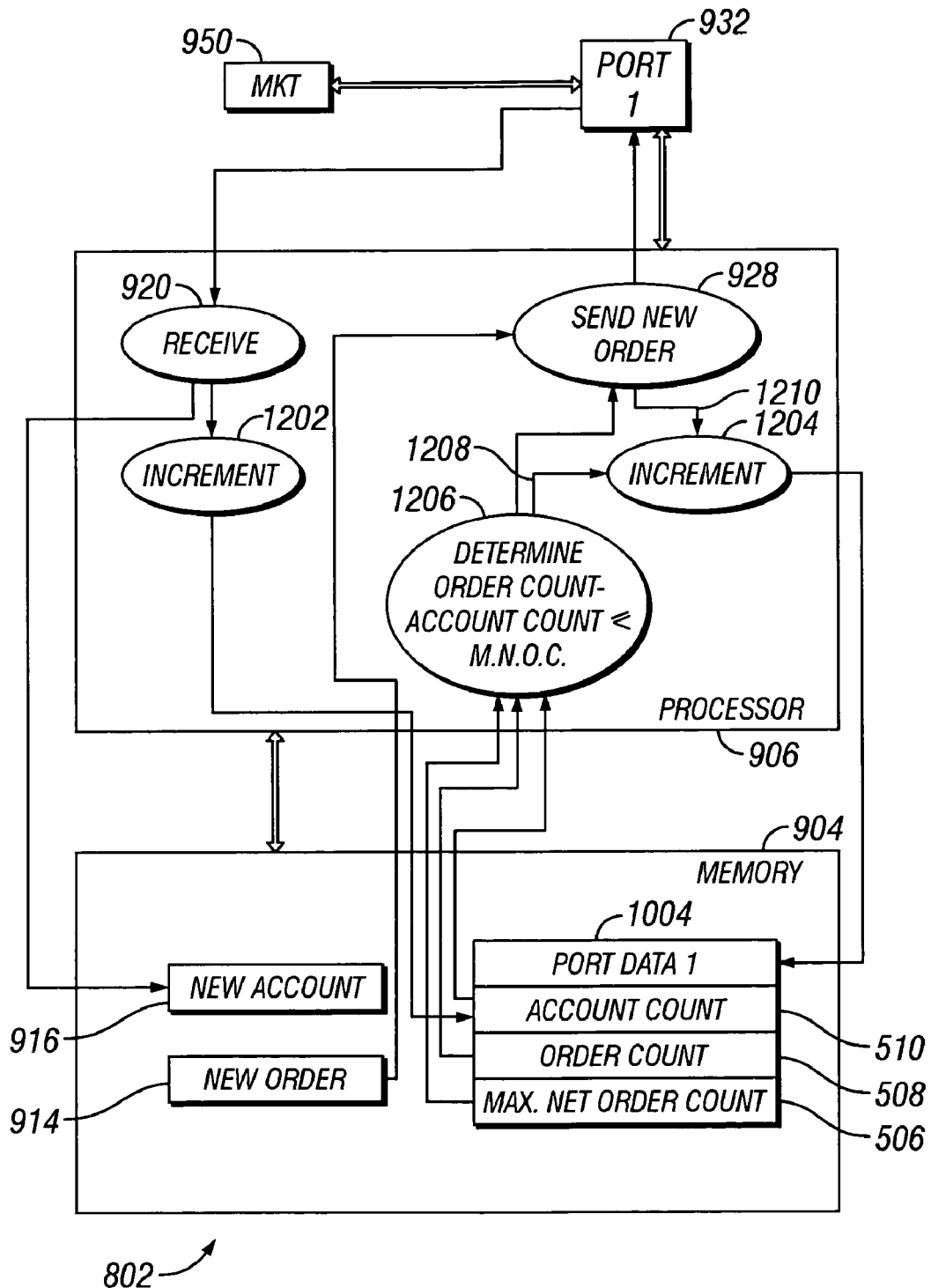
FIG. 12 illustrates a processor programmed for a determination of no overload by determining that an order count exceeds an acknowledgment count by less than a maximum net order count.

A further embodiment of the invention shown in FIG. 12 includes the processor (906) programmed to increment (1202) an acknowledgment count (510) for the port (932). The acknowledgment count (510) represents the number of acknowledgments received through the port during a defined period of time. An example of a period of time useful in the invention is one trading day. Various embodiments of the inventions use other periods of time, shorter or longer. Any functional period of time is well within the scope of the invention.

A further embodiment of the invention shown on FIG. 12 includes the processor (906) programmed to determine (1206) that an order count (508) for the port (932) exceeds the acknowledgment count (510) for the port (932) by at least a maximum allowed net order count (506). The order count (508) represents the number of orders sent through the port (932) during the defined period of time. The maximum net order count (506) indicates the maximum number of orders without acknowledgments allowed to be sent through the port (932). In this embodiment, the fact that the order count (508) for the port exceeds the acknowledgment count (510) for the port (932) by at least a maximum allowed net order count (506) indicates that the port is not overloaded.

The embodiment shown in FIG. 12 includes also the processor programmed to increment (1204) the order count (508) for the port (932). In some embodiments, the processor is programmed to increment (1204) the order count (508) for the port (932) after determining (1206) that the order count (508) for the port (932) exceeds the acknowledgment count (510) for the port (932) by at least a maximum allowed net order count (506) but before (1208) sending (928) a new order to market. In other embodiments, the processor is programmed to increment (1204) the order count (508) for the port (932) after determining (1206) that an order count (508) for the port (932) exceeds the acknowledgment count (510) for the port (932) by at least a maximum allowed net order count (506) and after (1210) sending (928) a new order (914) through the port (932) to market (950).

Figure 13:
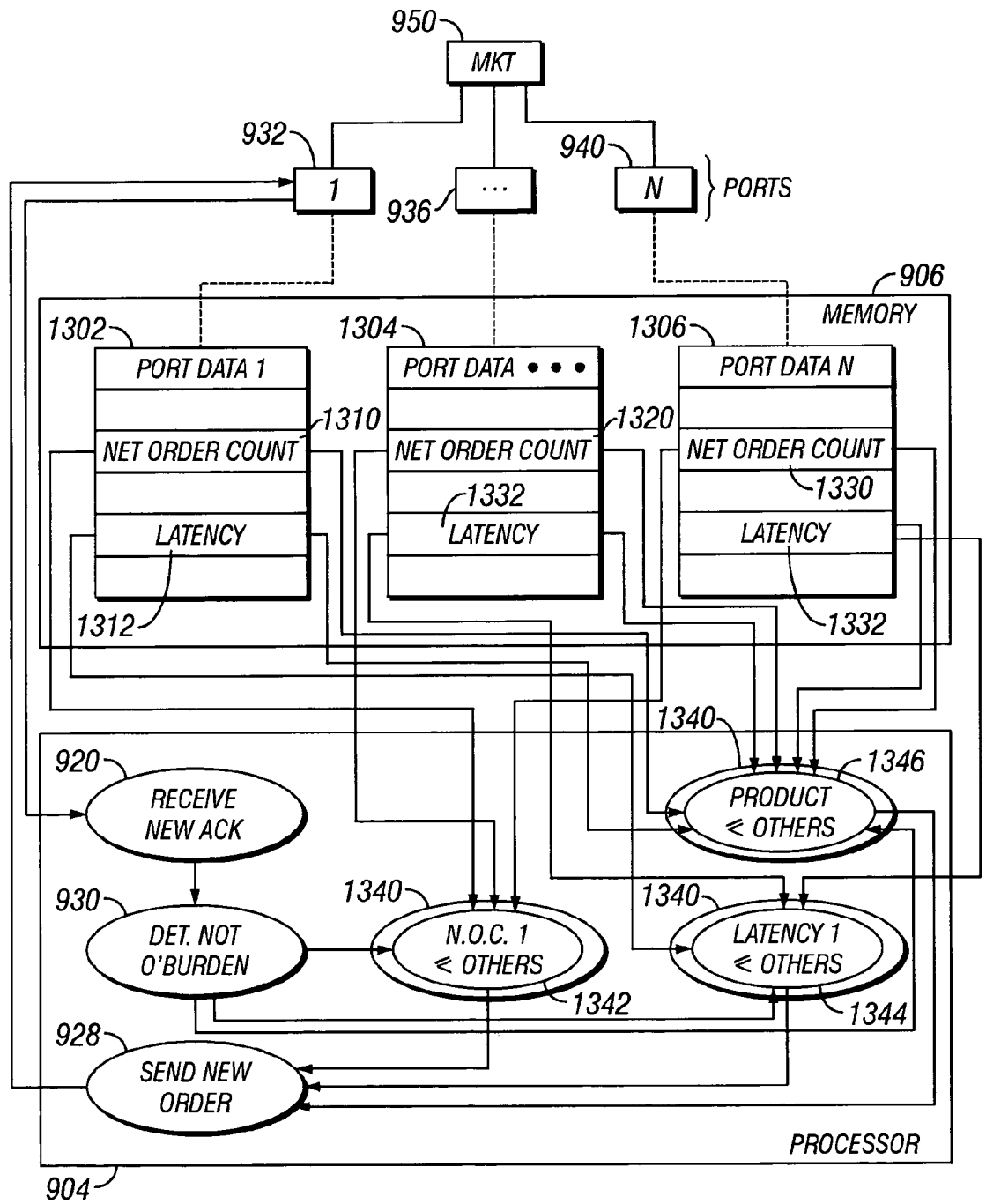
FIG. 13 illustrates alternative embodiments with a processor programmed to effect load balancing by use of least-loaded ports.

A further embodiment shown on FIG. 13 includes the processor (904) programmed to determine (1340), before sending (928) the new order through the port (932) to the market (950), that the port (932) is a least-loaded port. In this embodiment, the processor's sending (928) the order through the port to the market is dependent upon the determination (1340) that the port is a least-loaded port. More specifically, in this kind of embodiment, orders are sent to markets only through least-loaded ports.

A further embodiment of the invention illustrated in FIG. 13 includes a data structure (1302) for the port (932) having a net order count (1310) for the port (932). The net order count (1310) indicates the net number of orders sent through the port (932) to the market (950) for which acknowledgments have not yet been received from the market. In the illustrated embodiment, other ports (936, 940) coupled to the market (950) have data structures (1304, 1306) having net order counts (1320, 1330). In the illustrated embodiment, the processor (904) programmed to determine (1340) that the port is a least-loaded port further comprises the processor programmed to determine (1342) that the net order count (1310) for the port is not greater than any of the net order counts (1320, 1330) for the other ports coupled to the market (950).

A further embodiment of the invention illustrated in FIG. 13 includes a port data structure (1302) in which the port data structure has a latency (1312) for the port (932). Latency comprises a measure of the speed with which markets return acknowledgments for orders. In this embodiment, other ports (936, 940) coupled to the market (950) have data structures (1304, 1306) having latencies (1322, 1332). In the illustrated embodiment, the processor (904) programmed to determine (1340) that the port is a least-loaded port comprises the processor (904) programmed to determine (1344) that the latency (1312) for the port (932) is not greater than any of the latencies (1322, 1332) for the other ports (1304, 1306) coupled to the market (950).

A further embodiment of the invention illustrated in FIG. 13 includes a port data structure (1302) having a net order count (1310) for the port (932) and a latency (1312) for the port (932). The net order count (1310) indicates the net number of orders sent through the port (932) to the market (950) for which acknowledgments have not yet been received from the market. Latency comprises a measure of the speed with which markets return acknowledgments for orders. In the illustrated embodiment, other ports (936, 940) coupled to the market (950) also have corresponding data structures (1304, 1306) having net order counts (1320, 1330) and latencies (1322, 1332). In the illustrated embodiment, the processor (904) programmed to determine (1340) that the port is a least-loaded port further comprises the processor programmed (1346) to determine that the product of the net order count (1310) for the port (932) multiplied by the latency (1312) for the port (932) is not greater than the product of net order count (1320, 1330) and latency (1322, 1332) for any other port (936, 940) coupled to the market (950).

What is claimed is:

1. A method of balancing data communications loads among data communications ports in systems for automated trading of securities, the systems including at least one broker-dealer system coupled through at least one data communications system to more than one market system, the method comprising:

sending electronically a first order from a broker-dealer system to a market via a first port connected to said market, there being at least said first port and a second port connected between said broker-dealer and said market;

receiving through said first port from said market to which the first port is coupled an acknowledgment of said first order;

sending the acknowledgment from said first port to the broker-dealer system;

determining that the first port is not overloaded, the determination being dependent upon at least the first order, and the acknowledgment; and sending a second order through the first port to the market, the sending of the second order being dependent upon the determination that the first port is not overloaded.

2. The method of claim 1 wherein determining that the first port is not overloaded comprises:

determining that a latency for the first port is less than a maximum allowed latency for the first port, wherein latency comprises a measure of the speed with which markets return acknowledgments for orders.

3. The method of claim 1 further comprising:

decrementing a net order count for the first port stored in a processor, wherein the net order count indicates a net number of orders sent through the first port to the market for which acknowledgments have not yet been received from the market, wherein the net order count is decremented after receiving a new acknowledgment.

4. The method of claim 3 further comprising the steps of:

determining that the net order count for the first port is less than a maximum allowed net order count for the first port, wherein the maximum allowed net order count indicates the maximum number of orders without acknowledgments allowed to be sent through the first port, wherein the net order count being less than the maximum allowed net order count for the first port indicates that the first port is not overloaded; and incrementing the net order count after receiving a new order.

5. The method of claim 1 further comprising:

incrementing an acknowledgment count for the first port stored in a processor, wherein the acknowledgment count represents the number of acknowledgments received through the first port during a defined period of time.

6. The method of claim 5 further comprising the steps of:

determining that an order count for the first port exceeds the acknowledgment count for the first port by at least a maximum allowed net order count, wherein the order count represents the number of orders sent through the first port during the defined period of time, wherein the maximum allowed net order count indicates the maximum number of orders without acknowledgments allowed to be sent through the first port, wherein the order count for the port exceeding the acknowledgment count for the port by at least a maximum allowed net order count indicates that the port is not overloaded; and incrementing the order count for the first port.

7. The method of claim 1 further comprising determining, before sending the second order through the first port to the market, that the first port is a least-loaded port, wherein sending the order through the first port to the market is dependent upon determining that the first port is a least-loaded port.

8. The method of claim 7 further comprising:

determining a net order count for said first port, wherein the net order count for the first port indicates the net number of orders sent through the first port to the market for which acknowledgments have not yet been received from the market, and any other ports coupled to the market also having net order counts, wherein determining that the first port is a least-loaded port comprises determining that the net order count for the first port is not greater than any of the net order counts for the other ports coupled to the market.

9. The method of claim 7 further comprising:

determining latency for said first port, wherein said latency comprises a measure of the speed with which markets return acknowledgments for orders, wherein any other ports coupled to the market also have latencies, wherein determining that the first port is a least-loaded port comprises determining that the latency for the first port is not greater than any of the latencies for the other ports coupled to the market.

10. A method of balancing data communications loads among data communications ports in systems for automated trading of securities, the systems including at least one broker-dealer system coupled through at least one data communications system to more than one market system, the method comprising:

sending electronically a first order from a broker-dealer system to a market via a first port connected to said market, there being at least said first port and a second port connected between said broker-dealer and said market;

receiving through said first port from said market to which the first port is coupled an acknowledgment of said first order;

sending the acknowledgment from said first port to the broker-dealer system;

determining that the first port is not overloaded, the determination being dependent upon at least the first order, and the acknowledgment; and sending a second order through the first port to the market, the sending of the second order being dependent upon the determination that the first port is not overloaded;

determining, before sending the second order through the first port to the market, that the first port is a least-loaded port, herein sending the order through the first port to the market is dependent upon determining that the first port is a least-loaded port;

determining a net order count and a latency for said first port, wherein the net order count for said first port indicates the net number of orders sent through the first port to the market for which acknowledgments have not yet been received from the market, wherein latency for the first port comprises a measure of the speed with which markets return acknowledgments for orders, wherein any other ports coupled to the market have corresponding net order counts and latencies, wherein determining that the first port is a least-loaded port comprises determining that the product of the net order count for the first port multiplied by, the latency for the first port is not greater than the product of the net order count and the latency for any of said other ports coupled to the market.

11. A load balancing system for automated trading of securities in which data communications loads are balanced among data communications ports, the load balancing system coupled to a multiplicity of ports organized so that one market is coupled to the broker-dealer system through more than one port, the load balancing system operative when a new order from a broker-dealer system is available and ready to be sent through a port to said market, the load balancing system operative continually in turn upon each port assigned to said market, the load balancing system comprising:

computer memory;

at least one computer processor coupled for data communications to said computer memory and said broker-dealer system, and coupled through said data communications ports to more than one market, the processor programmed to:

receive through a port from a market to which the port is coupled an acknowledgment of a first order;

send the acknowledgment to the broker-dealer system;

determine that the port is not overloaded, the determination being dependent at least upon the first order, and the acknowledgment, and send a second order through the port to the market, the sending of the second order being dependent upon the determination that the port is not overloaded; and store in said computer memory by the processor the acknowledgment and the second order.

12. The load balancing system of claim 11 wherein the processor programmed to determine that the port is not overloaded determines that a latency for the port is less than a maximum allowed latency for the port, wherein latency comprises a measure of the speed with which markets return acknowledgments for orders.

13. The load balancing system of claim 11 further comprising the processor being programmed to decrement a net order count for the port, wherein the net order count indicates the net number of orders sent through the port to the market for which acknowledgments have not yet been received from the market, wherein the net order count is decremented in response to receiving a new acknowledgment.

14. The load balancing system of claim 13 further comprising the processor being programmed to:

determine that the net order count for the port is less than a maximum allowed net order count for the port, wherein the maximum allowed net order count for the port indicates the maximum number of orders allowed to be sent through the port without corresponding acknowledgments, wherein the net order count being less than the maximum allowed net order count for the port indicates that the port is not overloaded; and increment the net order count upon an order being sent through said port after said determination that the net order count for the port is less than the maximum allowed net order count for the port.

15. The load balancing system of claim 11 further comprising the processor being programmed to increment an acknowledgment count for the port, wherein the acknowledgment count represents the number of acknowledgments received through the port during a defined period of time.

16. The load balancing system of claim 15 further comprising the processor being programmed to:
determine that an order count for the port exceeds the acknowledgment count for the port by at least a maximum allowed net order count, wherein the order count represents the number of orders sent through the port during the defined period of time, wherein the maximum allowed net order count indicates the maximum number of orders without acknowledgments allowed to be sent through the port, wherein the order count for the port exceeding the acknowledgment count for the port by at least a maximum allowed net order count indicates that the port is not overloaded; and
increment the order count for the port.

17. The load balancing system of claim 11 further comprising the processor programmed to determine, before sending the second order through the port to the market, that the port is a least-loaded port, wherein sending the second order through the port to the market is dependent upon the determination that the port is a least-loaded port.

18. The load balancing system of claim 17 wherein a data structure for the port maintained in one of said processors comprises a net order count for the port, wherein the net order count indicates the net number of orders sent through the port to the market for which acknowledgments have not yet been received from the market, and other ports coupled to the market also have data structures maintained in said processors and having net order counts, wherein the processor programmed to determine that the port is a least-loaded port also is programmed to determine that the net order count for the port is not greater than any of the net order counts for the other ports coupled to the market.

19. The load balancing system of claim 17 wherein a data structure for the port maintained in one of said processors comprises latency, wherein latency comprises a measure of the speed with which markets return acknowledgments for orders, wherein the other ports coupled to the market have data structures having latencies, wherein the processor programmed to determine that the port is a least-loaded port also is programmed to determine that the latency for the port is not greater than any of the latencies for any other ports coupled to the market.

20. A load balancing system for automated trading of securities in which data communications loads are balanced among data communications ports, the load balancing system coupled to a multiplicity of ports organized so that one market is coupled to the broker-dealer system through more than one port, the load balancing system operative when a new order from a broker-dealer system is available and ready to be sent through a port to said market, the load balancing system operative continually in turn upon each port assigned to said market, the load balancing system comprising:
computer memory;
at least one computer processor coupled for data communications to said computer memory and said broker-dealer system, and coupled through said data communications ports to more than one market, the processor programmed to:
receive through a port from a market to which the port is coupled an acknowledgment of a first order;
send the acknowledgment to the broker-dealer system;
determine that the port is not overloaded, the determination being dependent at least upon the first order, and the acknowledgment and
send a second order through the port to the market, the sending of the second order being dependent upon the determination that the port is not overloaded; and
store in said computer memory by the processor the acknowledgment and the second order,
determine, before sending the second order through the port to the market, that the port is a least-loaded port, wherein sending the second order through the port to the market is dependent upon the determination that the port is a least-loaded port;
wherein a data structure for the port maintained in said processors comprises a net order count and a latency, wherein the net order count indicates the net number of orders sent through the port to the market for which acknowledgments have not yet been received from the market, wherein latency comprises a measure of the speed with which markets return acknowledgments for orders, wherein any other ports coupled to the market have data structures comprising net order counts and latencies, wherein the processor programmed to determine that the port is a least-loaded port also is programmed to determine that the product of the net order count for the port multiplied by the latency for the port is not greater than the product of net order count and latency for any other port coupled to the market.

21. The method of claim 1, said determination being made upon at least the presence of the first order, and the presence of the acknowledgment.

22. The system of claim 11, wherein determining that the port is not overloaded is dependent at least upon the presence of the first order, and the presence of the acknowledgment.

* * * * *